United States Patent [19]

Kindig

[11] 4,148,137

[45] Apr. 10, 1979

[54] APPARATUS FOR USE IN MAKING ELECTRICAL INTERCONNECTIONS

[75] Inventor: Alan L. Kindig, Holland, Mich.

[73] Assignee: General Electric Company, Fort Wayne, Ind.

[21] Appl. No.: 788,087

[22] Filed: Apr. 15, 1977

Related U.S. Application Data

[63] Continuation-in-part of Ser. No. 671,618, Mar. 29, 1976, Pat. No. 4,035,910, which is a continuation-in-part of Ser. No. 590,707, Jun. 26, 1975, Pat. No. 3,962,780.

[51] Int. Cl.² .................... B23P 19/00; B23P 17/02
[52] U.S. Cl. .................... 29/732; 29/736; 29/753; 29/596; 29/243.56; 72/441; 72/451
[58] Field of Search ............. 29/732, 753, 760, 736, 29/628, 596, 243.56; 72/451, 453.03, 441

[56] References Cited

U.S. PATENT DOCUMENTS

| | | | |
|---|---|---|---|
| 3,004,581 | 10/1961 | Krol et al. ................. | 29/753 |
| 3,051,213 | 8/1962 | Batcheller ................. | 29/753 |
| 3,124,019 | 3/1964 | Chatfield ................... | 72/451 |
| 3,190,319 | 6/1965 | Collins et al. ............. | 140/105 |
| 3,548,479 | 12/1970 | Netta et al. ................ | 29/753 |
| 3,641,650 | 2/1972 | Folk ........................... | 29/753 |
| 3,771,208 | 11/1973 | Taylor et al. .............. | 29/753 |
| 3,813,753 | 6/1974 | Miller ......................... | 29/753 |
| 3,859,708 | 1/1975 | Keim et al. ................. | 29/747 |
| 3,919,758 | 11/1975 | Stepan ........................ | 29/753 |
| 4,019,362 | 4/1977 | McKeever ................... | 29/753 |

FOREIGN PATENT DOCUMENTS

| | | | |
|---|---|---|---|
| 1169293 | 11/1969 | United Kingdom ......... | 29/753 |
| 1209762 | 10/1970 | United Kingdom ......... | 29/753 |

*Primary Examiner*—C. W. Lanham
*Assistant Examiner*—Daniel C. Crane
*Attorney, Agent, or Firm*—A. Burgess Lowe

[57] ABSTRACT

Method of making at least two different electrical interconnections with at least two wires extending from windings supported on a dynamoelectric machine core. The method includes moving the core, windings, and at least two wires toward a wire connecting device; orienting and positioning a first one of the at least two wires relative to the device; and thereby conditioning the device to establish a first one of at least two different connection configurations. A first electrical interconnection involving a first wire and having a first connection configuration is formed. A second winding lead then is oriented and positioned relative to the device, thereby to condition the device to form an interconnection having a second connection configuration, and such interconnection is made. Indicia that indicate the relative orientation of the stator assembly (or parts thereof) are utilized to condition the device to establish connections of desired different configurations. A stator holder is operatively interconnected with indicia means which may be limit switch actuating cams. Movement of the stator holder causes corresponding movement of the cams. The cams in turn establish the condition of control means that are operative to condition the apparatus so that crimped interconnections of predetermined final configurations are established. Another method involves adjusting the operational mode of a prime mover that controls the effective stroke of crimping tooling. The difference between minimum and maximum tooling movement is substantially continuously variable. In an illustrated form of apparatus, the prime mover is a pneumatic cylinder, and a rack is driven with the rod of the cylinder. The rack meshes with and rotates a drive pinion that is rotationally locked with eccentric means which support a toggle linkage. A method of scrap removal is provided which includes the steps of exhausting a pneumatic cylinder; guiding the exhausted air to a venturi chamber and thereby establishing a vacuum adjacent a crimping station thereby to collect scrap material; and directing the scrap material, along with the exhausted air, away from the crimping station.

3 Claims, 12 Drawing Figures

APPARATUS FOR USE IN MAKING ELECTRICAL INTERCONNECTIONS

CROSS REFERENCE TO RELATED APPLICATION

This application is a continuation in part of my co-pending application Ser. No. 671,618 (filed Mar. 29, 1976 and which issued as U.S. Pat. No. 4,035,910 on July 19, 1977) which in turn was a continuation-in-part of my then co-pending application Ser. No. 590,707 which was filed June 26, 1975 and which issued as U.S. Pat. No. 3,962,780 on June 15, 1976 (which is the subject of reissue application Ser. No. 912,343 which was filed on June 5, 1978). Also related is my co-pending application Ser. No. 698,922 which issued as U.S. Pat. No. 4,051,594 on Oct. 4, 1977. The entire disclosures of all three of these patents are incorporated herein by reference.

BACKGROUND OF THE INVENTION

The present invention relates generally to apparatus for use in making electrical interconnections and, more particularly, to such apparatus that is utilized in conjunction with making crimped connections involving at least one magnet wire lead of an inductive device such as a dynamoelectric machine.

In the manufacture of dynamoelectric machines, the excitation windings or coils are usually made of magnet wire-i.e., copper or aluminum wire covered with a suitable layer of insulation. It has been known for some time that it is generally less expensive to use a crimp connection approach (as opposed to brazing, welding, or soldering) when interconnecting leads or taps from such coils with one or more other wires (e.g., other magnet wire segments or standard lead wires). It has also been determined, however, that for some of the more demanding applications it is difficult and expensive (although technically possible) to provide crimped interconnections which will retain suitable conductivity characteristics over a long period of time.

For example, in hermetically sealed refrigerating compressor applications, stator assemblies (including excitation windings and electrical interconnections therewith) are normally exposed to a refrigerant fluid such as, e.g., one of the freon refrigerant materials. In this type of application, an internal failure (e.g., a high resistance connection) usually will require that the sealed compressor be replaced. Accordingly, it is necessary that any crimped interconnection be of very high quality and have a long life expectancy (in the neighborhood of twenty years, for some applications).

The need for crimped connections is especially great for hermetically sealed refrigeration motors with aluminum windings because the magnet wire insulation used for motors of this type creates a practically unsolvable problem when making connections by welding or brazing.

Experience has now shown that reliable connections may be made, but that it is important to control the final height of a crimped interconnection as a function of the cross-sectional area or size of the conductor (or other material) contained within the crimped connector. The optimum crimped connector height varies (as will be understood by persons skilled in the art) from one connector to another, for a given conductor area or size. Thus, it has previously been found to be desirable to provide methods and apparatus for varying the final crimped connector height and for feeding a "stuffer wire", when needed, to a crimping station.

In one prior approach devised by another, a pneumatically operated toggle linkage has been provided, wherein a generally "L" shaped arm has been supported at one extremity thereof by an eccentric pin. The other extremity of the arm has been conected to a frame supported ram; and the central portion of the arm has been connected (at a pivot) to one end of another arm. The second end of the another arm then has been interconnected with crimping tooling which was constrained to move along a path toward and away from other crimping tool parts.

In the approach just described, the eccentric pin has been interconnected with a crank arm which, in turn, was connected to a pneumatic cylinder. Then, upon closure of a foot pedal switch by an operator, the pneumatic cylinder could be energized to rotate the eccentric pin from a first rotational position to a second rotational position. The two different rotational positions of the eccentric pin provided two different "effective toggle stroke lengths", and thus have been utilized to provide two different finished crimped connector heights.

When following the approach just described, a stator assembly has been placed in a stator holder, moved to a crimping station, and rotated until a winding lead has been adjacent to the crimping station. It then has been necessary for the operator to mentally determine whether or not the crimp height controlling foot pedal should be depressed.

One variation from the above has been to provide "stuffer" wire feeding apparatus. Again, when such apparatus has been used, it has been necessary for an operator to decide whether stuffer wire should or should not be included in a crimped interconnection.

The above described approaches have not been fully satisfactory for a number of reasons. For example, the methods utilized have relied upon accurate operator recognition of the need for a particular one of two different crimp heights; and accurate operator recognition of whether or not a stuffer wire segment needed to be used. Moreover, in the case of apparatus with which I am familiar, the eccentric pin has been adjustable to only two different discrete positions with the result that the difference between a maximum crimp height and minimum crimp height has always been the same, even though it might be desired to vary such difference.

In crimp connection making apparatus, bits and pieces of wire, connectors, and foreign particles tend to appear and accumulate around a crimping station. It will be understood that it would also be desirable to provide methods and apparatus for removing such pieces and particles.

I have now also determined that connections not having desirable characteristics may be produced as a result of stuffer wire misplacement within a crimped connector having magnet wire therein. As used herein, "magnet wire" indicates electrically insulated copper, aluminum, aluminum alloy, or any other electrically insulated conductive material used in the manufacture of motors, generators, alternators, or transformers wherein electrical insulation of the conductive material is established and maintained by a thin, adherent, film-like coating on the conductive material. This coating, sometimes referred to as "varnish", adheres tenaciously to the conductive material, and is very tough yet flexible thereby to prevent cracking or crazing thereof during coil winding, coil placing, and coil shaping operations.

Because of the nature of the insulative coating on magnet wire, connectors having a multiplicity of serrations have been used. During a crimped-connection making process, the teeth or serrations of the connector clips are intended to pierce the magnet wire insulative coating and establish a low resistance interconnection between two or more magnet wire segments. In practice however, I have found that such interconnection may not be established if stuffer wire material is adjacent to the serrated surface of a clip while it is being crimped. This result seems to occur because the stuffer wire tends to fill the notches or grooves adjacent to the teeth of the clip, and inadequate penetration of the magnet wire insulation results.

It is one object of the present invention to provide improved apparatus wherein the effective final height of a crimped interconnection may be varied between minimum and maximum heights, and wherein the difference therebetween may also be easily changed or varied.

It is another object of the present invention to provide new and improved crimping apparatus of a type that utilizes eccentric means for providing interconnections of different configurations, and wherein means are included whereby the effective range of adjustment of the eccentric means may be substantially continuously varied between two different limits.

SUMMARY OF THE INVENTION

In carrying out the above and other objects of the invention, one approach involves making at least two different electrical interconnections with at least two wires extending from windings supported on a dynamoelectric machine core. This approach includes moving the core, windings, and at least two wires toward a wire connecting device; orienting and positioning a first one of the at least two wires relative to the device so as to position the first one of the at least two wires at a connecting station of the device; and conditioning the device to form a first one of at least two different connection configurations while so positioning the first one of the at least two wires. Thereafter, at the connecting station of the device, I form a first electrical interconnection involving the first one of the at least two wires, with the first electrical interconnection having a first one of at least two different connection configurations. I then orient and position a second winding lead relative to the device so as to position the second winding lead at a connecting station of the device, and condition the device to form an interconnection of a second connection configuration. The electrical interconnection of a second configuration is then made at the connecting station of the device; and subsequently, the stator assembly is moved away from the device. Indicia that indicate the relative orientation of the stator assembly (or parts thereof) may be utilized to condition the device to establish connections of desired different configurations.

In one illustrated form of apparatus a stator holder is provided which is operatively interconnected with indicia means which are in the form of limit switch actuating cams. Movement of the stator holder, with the winding leads positioned in predetermined fixed positions relative thereto, causes corresponding movement of the cams. The cams in turn establish the condition of control means that are operative to condition the apparatus so that crimped interconnections of predetermined final configurations are established.

In accordance with one preferred form of the invention, there is provided an apparatus having an adjustable operational mode of a prime mover that controls the effective stroke of crimping tooling thereby to establish differently configured crimp connections during operation of the apparatus upon a given stator assembly. The difference between minimum and maximum tooling movement is substantially continuously variable. In the illustrated form of apparatus, a means for automatically adjusting the angular position of an eccentric pin is provided which includes the prime mover which may be, for example, a pneumatic cylinder, and a rack is driven with the rod of the cylinder. The rack meshes with and rotates a drive pinion that is rotationally locked with the eccentric means which support a toggle linkage. Means are provided on the pneumatic cylinder for controllably adjusting the stroke of the cylinder, and thus rotational movement of the eccentric means is controllably varied to thereby establish different selectable strokes of the toggle linkage.

Scrap generated in performing the electrical interconnections is removed by a method which includes the steps of exhausting a pneumatic cylinder; guiding the exhausted air to a venturi chamber and thereby establishing a vacuum adjacent a crimping station thereby to collect scrap material; and directing the scrap material, along with the exhausted air, away from the crimping station. Illustrated apparatus that embodies other features of the invention includes a venturi defining structure and a vacuum (or low pressure) defining structure positioned adjacent to a crimping station.

In performing an electrical interconnection operation, I place one or more segments of magnet wire along a serrated surface of a connector, and then place a segment of filler wire (when needed) consistently in a position removed from the serrated surface. I place the filler in a desired position by feeding it through a clip feeding mechanism. This technique can be used to ensure that the filler wire will be positioned above magnet wire segments that are positioned along a serrated connector surface. When a segment of filler is to be used, a length of filler material is advanced through the feeding mechanism, and a portion of filler at the end of the segment is included in the crimped connection. The balance of the segment of filler material then is retracted through or into the feeding mechanism and thus straightened. With the above described arrangement of parts, the filler wire end (while being advanced) cannot engage sides of connector clips and thus buckle.

BRIEF DESCRIPTION OF THE DRAWINGS

The subject matter which I regard as my invention is particularly pointed out and distinctly claimed in the concluding portion of the specification. My invention itself, however, both as to its organization and method of operation, together with further objects and advantages thereof, may best be understood by reference to the following description taken in connection with the accompanying drawings wherein:

DESCRIPTION OF THE PREFERRED EMBODIMENTS

Figure 1:
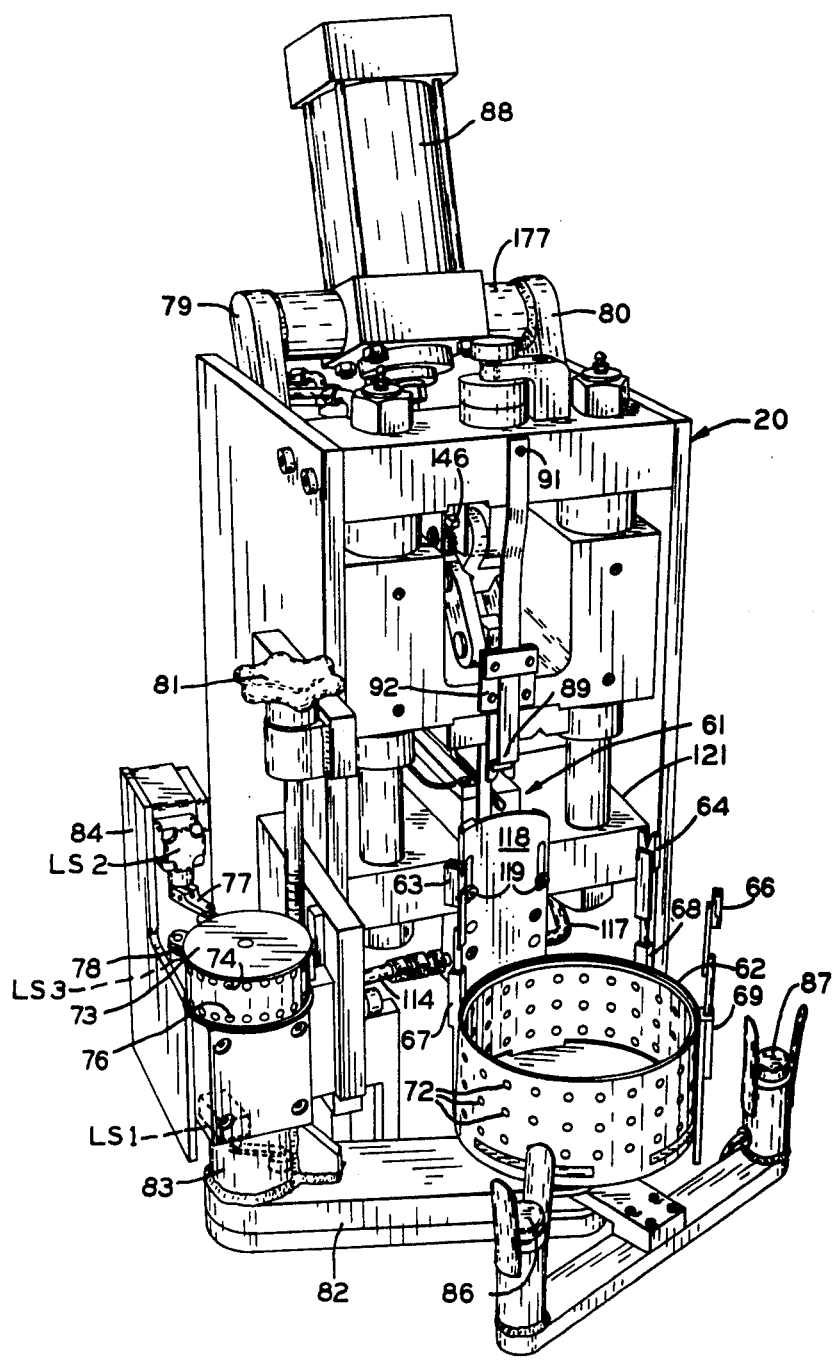
FIG. 1 is a front perspective, with parts removed and parts broken away, of apparatus that embodies certain aspects of the present invention in one form thereof, and which may be utilized when practicing the invention in another form.

With reference now to FIG. 1, I have illustrated a new and improved apparatus, generally denoted by the reference numeral 20, which may be utilized to carry out and practice the invention in preferred forms thereof.

Figure 6:
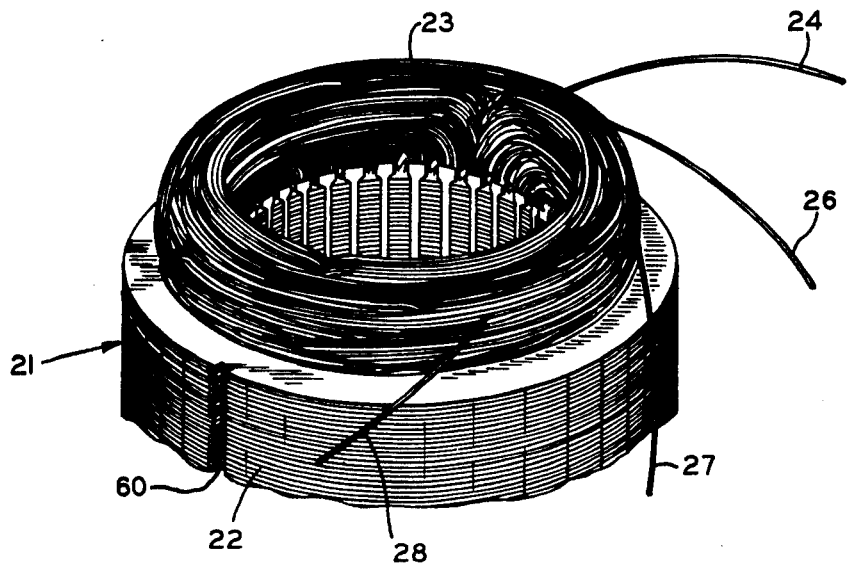
FIG. 6 is a view of a portion of a stator assembly that is to be operated upon when performing methods and utilizing apparatus embodying the invention.

With reference now to FIG. 6, it will be appreciated that a stator assembly 21 has been illustrated which includes a magnetic core 22 and excitation windings 23. The assembly further includes four winding leads 24, and 26-28. As will be understood, the leads 24 and 26-28 extend from different ones of (or different sections or poles of) the excitation winding 23. For example, lead 24 may be connected to one end of an auxiliary winding and lead 26 may extend from the other end of the same winding. Leads 27 and 28, on the other hand, may represent the ends of a main winding phase.

It should be understood that the stator assembly 21 has been illustrated only for purposes of discussion and that the number of leads extending from a given stator assembly may be more or less than those shown. For example, additional leads may extend from a winding when multi-speed operation is desired. Moreover, in the event that part of the winding has been inadvertently broken, the two broken ends may be pulled out externally of the stator assembly so that they extend in a manner similar to that illustrated for lead 24. The two broken ends may then be interconnected, according to the invention, in order to effect a repair of the stator assembly winding.

Assuming, for a moment, that leads 24 and 26 represent the ends of an auxiliary winding and that leads 27 and 28 represent the ends of a main winding, one common practice would be to establish an interconnection involving leads 26 and 27 and a stranded external lead wire. This lead then usually would be connected to one side of a conventional power supply during motor operation. Lead 24 (assuming that it extends from the other end of an auxiliary winding) would then be interconnected with a stranded lead wire and under normal conditions, be connected through a capacitor or suitable switching contacts to the other side of the power supply. Lead 28 (assuming that it extends from the other end of the main winding) would then be interconnected through suitable circuit means to the other side of the power supply.

Figures 7, 8, 9:
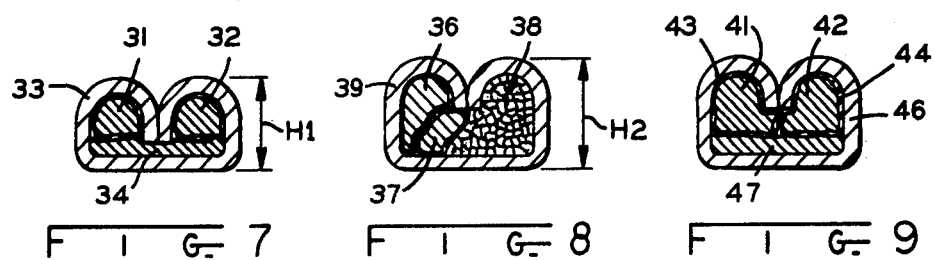
FIGS. 7, 8, and 9 are views of various interconnection configurations that may be provided when practicing the invention disclosed herein.

FIGS. 7-9 represent different types of crimped interconnections involving magnet wire leads such as those discussed hereinabove in connection with FIG. 6. In FIG. 7, for example, there has been illustrated an interconnection that represents the repair of an inadvertently broken winding turn. In FIG. 7, the numerals 31, 32 denote the broken strands of a winding that have been crimped together during a repair procedure. Contained within a crimped connector 33 is a flattened piece of conductive material 34 which is referred to herein as a stuffer wire. If the wires 31, 32 are formed of aluminum, then the stuffer wire 34 also, preferably, is aluminum. When the magnet wires are formed of copper, the stuffer wire may be of aluminum or copper. It will be noted that, during the crimping process, the wires 31, 32 and 34 are pressed within the confines of the crimped connector 33. It will also be noted that the heighth H1 of the crimped interconnection of FIG. 7 is less than the heighth H2 of the crimped interconnection shown in FIGS. 8 and 9.

FIG. 8 has been drawn to represent an interconnection involving two lead wires extending from a stator assembly (for example, lead wires corresponding to leads 27 and 26 of the stator assembly 21). These leads have been denoted by the numerals 36, 37, and a stranded lead wire comprised of a number of individual strands has been indicated by the reference numeral 38 within the crimped connector 39.

In FIG. 9, two relatively large strands of magnet wire 41, 42 (each surrounded by an insulating covering 43, 44) are shown interconnected and bounded by a crimped connector 46. In the FIG. 9 illustration, a length of stuffer wire 47 has been utilized in order to increase the cross-sectional area encompassed by the crimped connector 46.

Close review of FIGS. 7 and 9 will reveal that the filler or stuffer wire segments 34 and 47 are located along the relatively flat, bottom portions of connectors 33, 46. I have not determined that it is generally preferable for magnet wire segments to be positioned along the bottom of connectors 33, 46 and the stuffer wire segments positioned thereover. This particular relative placement of magnet wire and stuffer wire segments is preferable because, depending on the final crimp height, actual volume of wires contained therein, and characteristics of the magnet wire insulation; a higher percentage of defective or "high resistance" connections may result if the stuffer wire is below the magnet wire (as shown in FIGS. 7 and 9) rather than above it.

Although it is not initially apparent, the connectors of FIGS. 7, 8, and 9 are all substantially identical, one to another, prior to being crimped about the respective ones of the interconnected wires. For example, each of the connectors are substantially identical to the connector 48 which illustrates a type of clip available from Essex International of Fort Wayne, Ind., and identified by that company as clip number 851218-C17. It is generally specified, for these particular clips, that suitable results will be obtained when the final crimp heighth ranges from 0.065 inches to 0.085 inches (1.651 millimeters to 2.159 millimeters). Thus, "H1" for the above identified clip should be no less than 0.065 inches, and "H2" should be no greater than 0.085 inches. A satisfactory connection with the above identified clip is established when the circular mil area of the wire contained within the finished crimped connection ranges from 3,000 circular mils to 6,500 circular mils. It should be understood that the circular mil area contained within a crimp and the final heighth are subject to permissible manufacturing tolerances and a range of heights (for example plus or minus 0.003 of an inch) will still provide a suitable connection for a given circular mil wire area.

Figure 10:
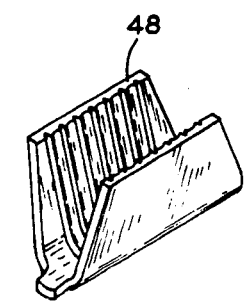
FIG. 10 is a perspective view of a connector clip, known per se, that is shown in other drawing views.

With continued reference to FIG. 10, it will be noted that clips such as the clip 48 are provided with a number of serrations or grooves which bite into and pierce the insulation about the magnet wires 31, 32, etc. in FIGS. 7-9. In this manner, a low resistance electrical interconnection is established between each wire contained within a connector clip and the body of the clip itself. As mentioned hereinabove, however, low resistance interconnections can be more consistently established when the magnet wires are positioned at the bottom of the crimped connector clip.

With reference now once again to FIGS. 7-9, it will be understood that it is a routine procedure to plan, in connection with the production of a given electric motor stator assembly (such as the stator assembly 21), which wires are to be interconnected with each other and to plan whether a minimum height crimp (height H1) or a maximum height crimp (H2) will be needed to ensure that a reliable electrical interconnection will be made. Moreover, it is a routine procedure to plan in advance, for a given stator model, whether a length of stuffer wire will be needed in order to ensure that the final crimped interconnection will have adequate conductor contained therewithin to ensure a suitable and reliable electrical interconnection.

It will be noted that if too great an area of conductor wire is contained within a crimp of a given height, the wires may be cut or severed and a poor connection will result. On the other hand, if the crimp has not been closed to a small enough height for a given conductor area, a relatively loose interconnection may be provided, or the insulation on the magnet wire segments may not be adequately pierced, and a suitable interconnection may not be established.

Turning now to FIG. 1, one method by which the above desired results may be obtained will be explained in conjunction with the apparatus 20. It is first noted that a preferred method involves placing a stator core assembly (such as the one shown in FIG. 6) in a desired position relative to the crimping apparatus 20. More specifically, one or more lead wires extending from the stator assembly are positioned adjacent to a crimping station 61, and the step of positioning or orienting the lead wires adjacent to the crimping station conditions the apparatus 20 so that a stuffer wire segment will be provided if needed; and the tooling of the apparatus will be adjusted so that a crimped connection having a final desired planned height will be established for the interconnection involving the particular magnet wire lead (or leads) that has been positioned at the crimping station.

For convenience, a slot or key may be provided in a stator holder 62 so that the stator assembly 21 cannot be positioned therein in a strictly random orientation. For example, an internal key or member may be utilized that would interfit with a marker notch 62 (see FIG. 6) of the stator assembly 21. However, it also is possible to paint or otherwise provide reference indicia on the core of the stator assembly 21 and then visually align such indicia with a reference part of the stator holder 62 in order to establish an initial predetermined desired orientation of the stator assembly relative to the stator holder.

The magnet wire leads of the stator assembly then are positioned and held in lead holders 63, 64, and 66.

The various lead holders 63, 64, and 66 are each supported from a post that is in turn fastened to the stator assembly holder by substantially identical brackets 67-69. The brackets 67-69 may be fastened to the stator holder 62 by screws that thread into threaded holes 72 which are positioned around the stator holder 62.

The holder 62 is interconnected with a drum 73 which has first and second series of holes 74, 76 located therein. These holes are tapped and are disposed with an angular spacing equal to the angular spacing of holes 72 in stator holder 62. Cam members are mounted (for example with Allen screws) to the cam cylinder or drum 73. These cams are identified by numerals 96, 97, 98 in FIG. 2. Such cams are provided so that they may engage limit switch arms 77 or 78. In the event that limit switch arm 77 is actuated, it will condition the apparatus 20 to establish a crimp height of a desired mimimum height. On the other hand, the actuation of limit switch 78 causes a length of stuffer wire to be fed into the crimping station 61 prior to a crimping operation, so that stuffer wire will be included in the final interconnection.

With the foregoing in mind, it will be understood that production operations will be planned so that leads exiting from different portions of the stator will be placed in a next adjacent lead holder 63, 64, 66; and cams will be located on drum 73 so that the apparatus 20 will be conditioned to make an interconnection of the proper configuration whenever any given lead is positioned at station 61. Thus, as the stator holder 62 is rotated (i.e., oriented so as to present a different lead holder to the crimping station 61) drum 73 will rotate in synchronism therewith and, depending upon the presence or absence of cams in the series of holes 74, 76; either one or both of the limit switch arms 77 or 78 will be deflected, and the apparatus 20 will be conditioned to provide a crimp configuration having precisely the desired configuration.

For a given stator height, adjusting knob 81 is manually adjusted to raise or lower the entire stator manipulating portion of the apparatus 20 so that the lead wires of the given stator will be approximately level with the station 61. The stator manipulating structure includes the stator holder 62, a swing arm 82, the pivot post 83, cylinder or drum 73, and limit switches which are supported by a plate 84. The heighth of these parts are adjusted with knob 81 so that leads will be positioned at least approximately at the same height as the crimping tooling at the station 61.

After the magnet wire leads that extend from a stator assembly (positioned in the holder 62) are placed in the lead holder 63, 64 etc.; the stator holder is oriented so that a first one of the leads are positioned at the crimping station. Thereafter, the operator of apparatus 20 actuates a pair of switches 86, 87 and a foot switch. This in turn energizes the apparatus 20 to establish one crimped interconnection. The crimped interconnection would, in most cases, involve at least one magnet wire lead and a piece of stranded lead wire which is positioned (along with the one or more magnet wire leads) in the crimping station 61, all as will be understood by persons of ordinary skill in the crimp connection art.

After a crimp connection has been completed, a main pneumatic power ram 88 retracts the rod thereof so as to raise (as viewed in FIG. 4) the upper portion of the crimping tooling. In order to prevent the crimped connection from sticking in the upper tooling, a stripper finger 89 is provided for dislodging interconnections from the movable tooling. The finger 89 may be formed of any suitable material and may, for example, be a piece of spring steel fastened to the frame of the apparatus 20 by a screw 91 and a bracket 92 all as is clearly revealed in FIG. 1.

Figure 2:
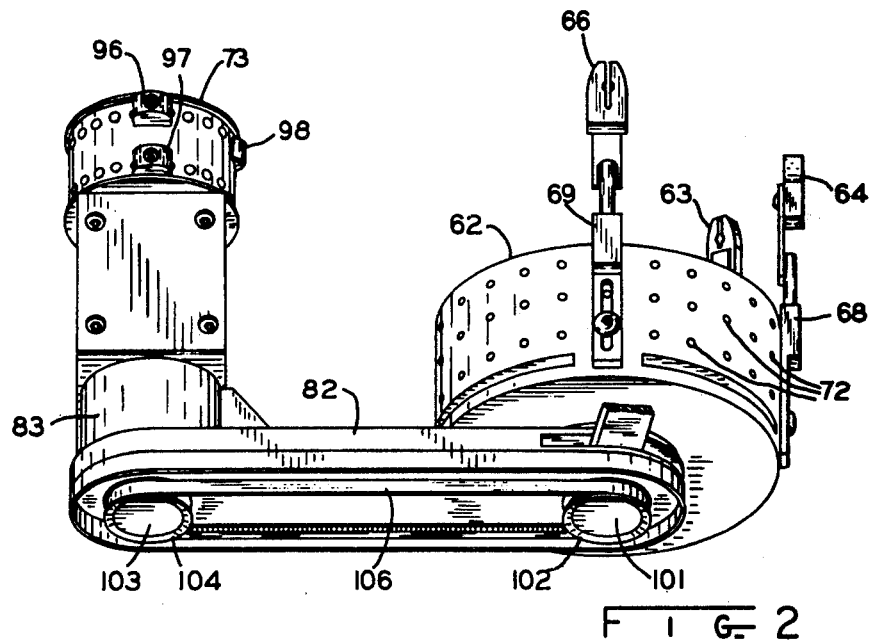
FIG. 2 is a perspective view of some of the parts of the apparatus shown in FIG. 1.

It will be seen from FIG. 2 that cams 96–98 are therein revealed, and that the stator holder 62 is supported by a shaft 101 which has a timing belt pulley 102 secured thereto. Similarly, the cylinder or drum 73 is supported and rotates with a shaft 103. A shaft 103 which has fixed thereto a timing belt pulley 104. A timing belt (or other non-slipping drive means) 106 is provided to interlock the stator holder 62 and the drum 73. As the stator holder 62 is rotated so as to reorient a stator assembly relative to the crimping station 61 (see FIG. 1), the drum 73 is rotated so as to move different arcuate segments thereof in proximity with the previously mentioned limit switch arms.

Figure 3:
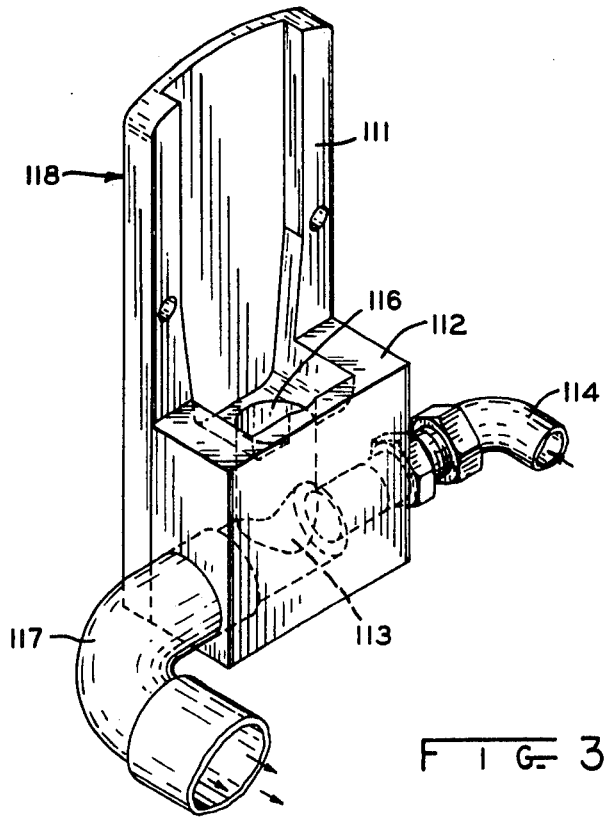
FIG. 3 is a perspective view of still another part of the apparatus shown in FIG. 1.

The structure of FIG. 3 includes a collecting block 111, which is machined as a unitary structure with a manifold block 112 that includes a venturi 113. The exhaust ports of the main pneumatic cylinder 88 are interconnected with conduit 114 and, as cylinder 88 retracts the rod thereof, the air exhausted from the cylinder is passed through conduit 114 and across the venturi 113 within the block 112. Due to the venturi effect, a low pressure or near vacuum condition is established in the region 116 so that any particles in the vicinity of region 116 will be moved by suction forces into the venturi 113. The particles so moved, along with the air moving within conduit 114, are then exhausted along an exhaust tube 117 to a scrap collection bag or other container.

This vacuum device, generally denoted by the reference numeral 118 in FIG. 3, is clearly revealed in FIG. 1 and is fastened adjacent to the crimping station by means of a pair of screws 119 which fasten the vaccum arrangement to the base 121 of the apparatus 20. Thus, during and after the formation of each crimped connection, a vacuum is applied by means of the vacuum device 118 in the vicinity of the crimping station 61 and scrap wires, pieces of severed connector material, and other debris in the area of the crimping station 61 are exhausted (along with the exhaust of the main drive cylinder 88) to a not shown scrap collecting container.

The actual mode of operation of the apparatus 20 will now be described by having joint reference to FIGS. 1 and 4. At the outset, it should be noted that four different pneumatic cylinders are utilized in conjunction with, and during the operation of, apparatus 20. The first of these cylinders is the previously mentioned cylinder 88 which, in one reduction to practice, was a Hydro-Line air cylinder series LR2U (purchased from the J. N. Fauver Company of 318 Mart Street SW, Grand Rapids, Mich.). The cylinder 88 had a four-inch stroke and a 3¼ inch bore, and was a trunnion mount cylinder with a one-inch diameter rod. The rod end 126 was provided with sufficient thread to permit it to be easily threaded into the yoke 127 and still have sufficient thread to permit the use of jam nut 128.

A second cylinder 129 was a "Tiny Tim" cylinder with a two-inch stroke, 1⅛ inch bore, 5/16 inch rod, Model DTF. A third cylinder 131 was also a Tiny Tim cylinder, MODEL TC with a ¾ bore and 1 inch stroke. The just referenced Tiny Tim cylinders were purchased from Kundinger Fluid Power, 100 Alloy Drive, Fenton, Mich.

A fourth cylinder was contained within the wire stuffer unit 132 which was purchased as an assembled package from Essex International, of Engle Road, Fort Wayne, Ind. The designation of the wire stuffer feed mechanism 132 by Essex international was "wire stuffer, US-10". When the cylinder of the wire stuffer unit 132 is operated, it advances a length of the stuffer wire.

Figure 4:
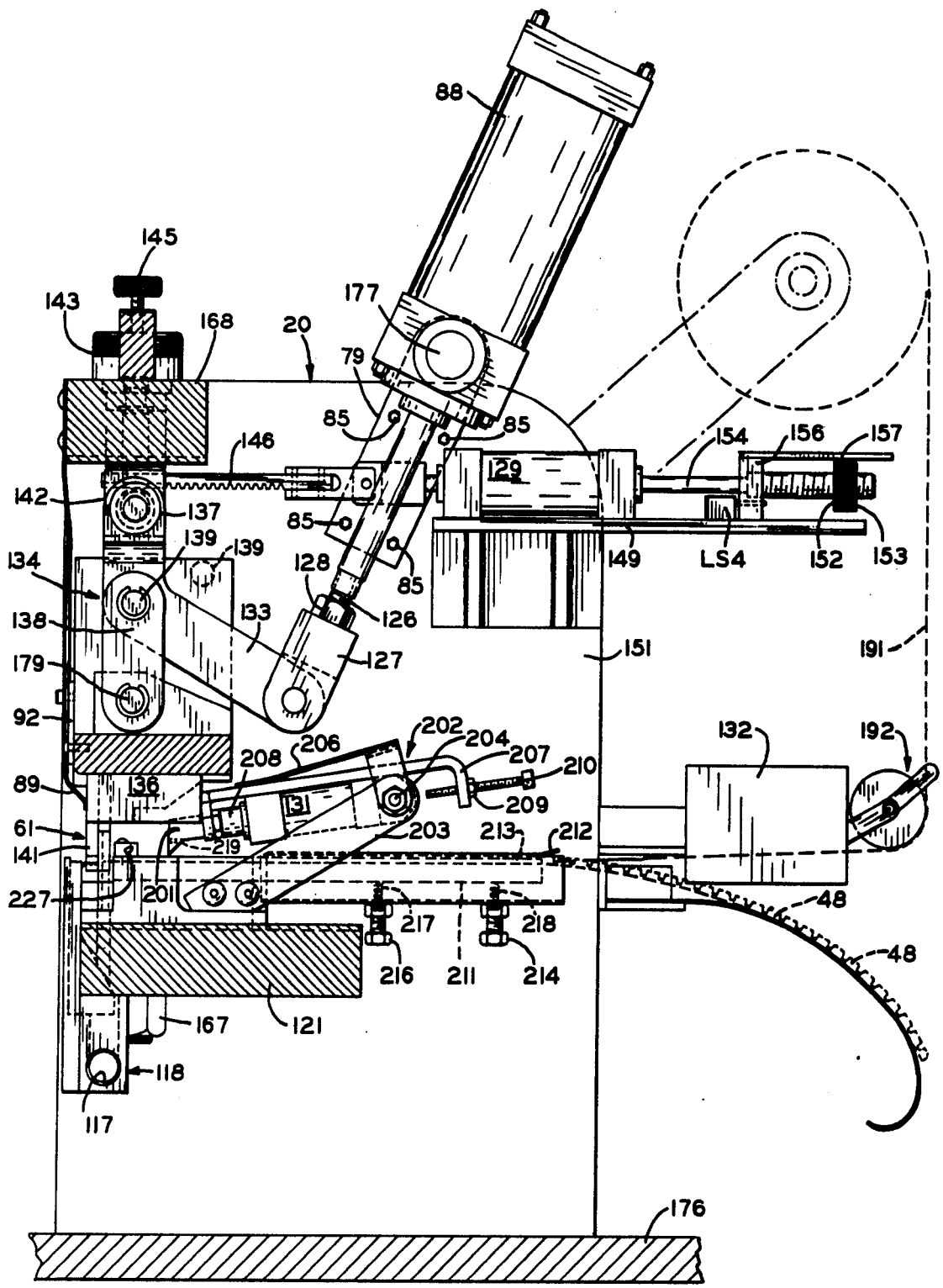
FIG. 4 is a side elevation, with parts in section and parts removed, of the apparatus of FIG. 1.
Figure 5:
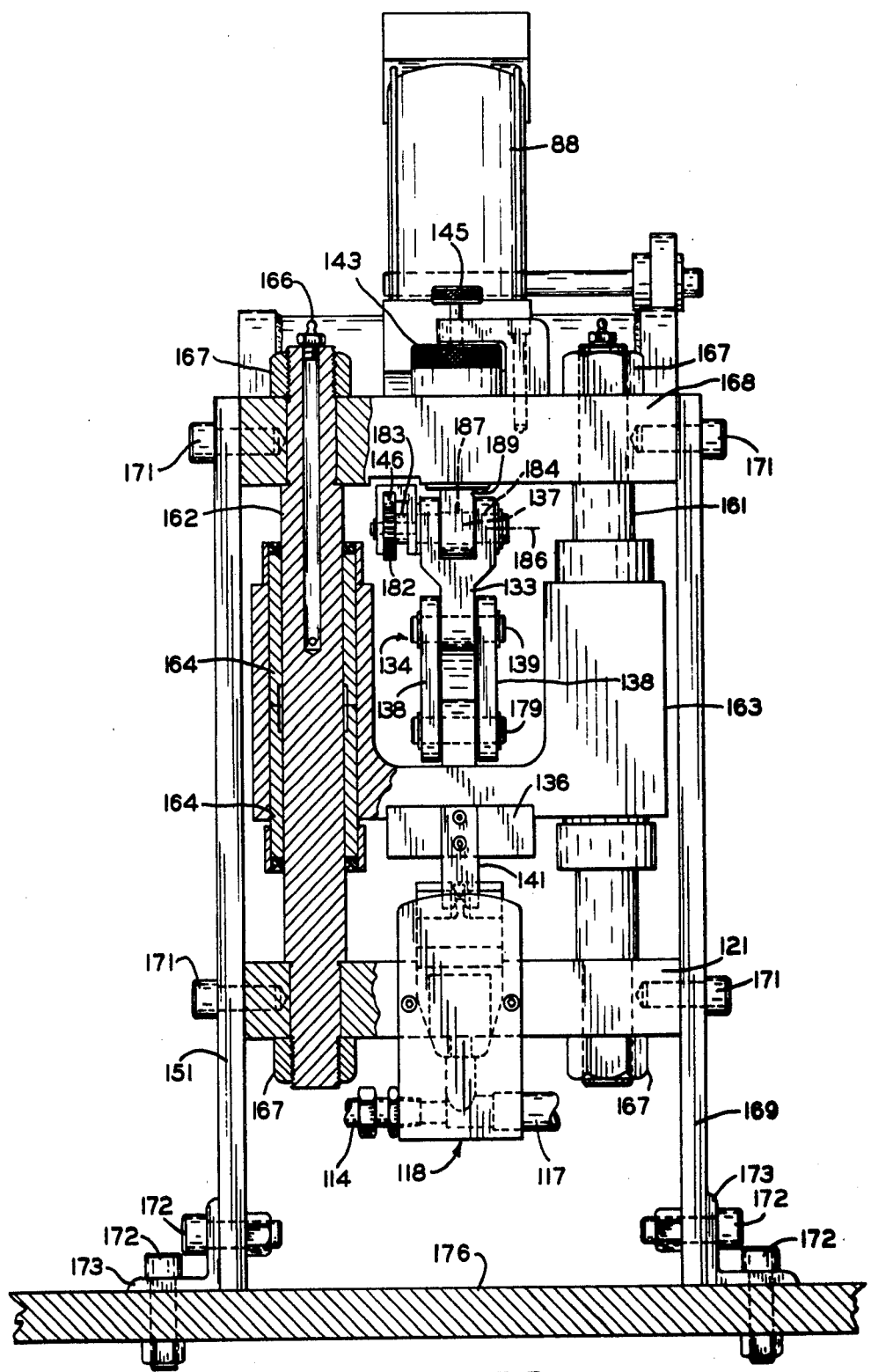
FIG. 5 is a front elevation of the apparatus of FIG. 1, with parts removed, parts broken away, and parts in section.

The cylinder 88, in FIG. 5, has been shown with the rod thereof in its fully extended position at the end of a power stroke. In this position, arm 133 of toggle linkage 134 has moved to its lower-most position and driven the upper tooling block 136 to a crimping position. When the cylinder 88 retracts, it pivots the arm 133 upwardly about an eccentric pivot pin 137; and tooling block 136 moves vertically upwardly, with link members 138 raising the pivot pin 139 to a dotted line position thereof as illustrated by phantom lines in FIG. 4.

The lower most position of the movable tooling or die 141 is determined by two different mechanisms in the apparatus 20. A first of these is the support block 142 which may be adjusted vertically by means of an adjusting knob 143 which is threaded through an upper frame member 168 and carries the support for the eccentric pin 137. In addition, the orientation of the eccentric pin 137 has some control on the limits of travel of the tooling 141.

Gross adjustments for different crimp connectors (or clips) are made by loosening lock bolt 145 and adjusting the hand wheel or knob 143 so as to raise or lower the eccentric pin 137. On the other hand, the angular orientation of the eccentric pin 137 is determined by the relative angular position of a drive pinion that is interconnected therewith and driven by a rack 146 (by the pneumatic cylinder 129).

It will be noted that the pneumatic cylinder 129 is supported on a plate 149 which has been welded to a side frame member 151 of the apparatus 20. The stroke of the cylinder 129 is controlled by adjusting a stop nut 152 (along with jam nut 153) to different axial positions along the threaded extension of the cylinder rod 154 of cylinder 129. By moving the stop nut 152 to the left (as viewed in FIG. 4), movement of rod 154 ceases earlier in a cylinder stroke because the stop nut 152 is arrested from further movement by its engagement with a stop member 156 carried by the support plate 149.

If desired, indicia may be provided along the plate 157, such indicia corresponding to predetermined amounts of angular movement of the eccentric pin 137. It also should be noted that a limit switch LS4 is supported on plate 149 and is actuated whenever nut 152 has moved into abutment with the stop member 156.

With reference to FIG. 5, it will be noted that a number of heavy cylindrical guide rods 161, 162 are provided and that an upper tooling carriage 163 (which supports tooling block 136) is supported for vertical movement along the guide rods 161, 162. Bushings 164 and lubrication means 166 are provided as will be understood. The rods 161 and 162 are fastened with a number of nuts 167 to upper frame member or plate 168 and the base plate or lower frame member 121.

The pair of side plates 151, 169 support the plates 121 and 168 and are interconnected therewith with a number of bolts 171. The entire frame for the apparatus 20 is fastened by any suitable means (as illustrated for example by bolts 172 and feet 173) to a support 176.

It will be noted from FIG. 1 that cylinder 88 is supported from the frame of the apparatus 20 by means of a shaft 177; and from FIG. 5 that the links 138 of the toggle linkage 134 are interconnected to the carriage 163 by means of a pivot pin 179. As the toggle linkage 134 moves under the influence of cylinder 88, the carriage 163 moves along the guide rods 161, 162. The previously mentioned pinion, which controls the relative position of the eccentric pin 137, has been shown at 182 in FIG. 5 and it will be understood that the pinion 182 and link 133 are mounted on round shaft journals 183 and 184. However, the portion of the shaft or pin located between the arms of link 133, although round, is eccentric or offset relative to journals 183 and 184. Thus, as pinion 182 is rotated, the center of the shaft journals 183, 184 (represented by the line 186) will either be raised or lowered depending on the angular rotation of the pinion 182 and the eccentric pin portion 187. The center of eccentric 187 is offset about 0.010 of an inch (0.254 millimeters) from the center of portions 183, 184. Thus, 180 degrees of rotation of pinion 182 can effect 0.020 of an inch of movement of the centerline of journals 183 and 184. Accordingly, the eccentric supported by carrier 189 can be used to vary crimp heights by as much as 0.020 of an inch (0.508 millimeters). The location of the carrier 189 relative to the frame of apparatus 20 is also adjusted by turning the knurled adjusting knob 143, as needed, for initial machine set up for any given stator model or model of connector clip.

By considering together FIGS. 1, 4, and 5, it will be seen that the shaft 177 is supported by arms 79 and 80 which in turn are fastened to side frame members or plates by suitable means such as bolts 85 (see FIG. 4).

With continued reference to FIG. 4, it will be understood that, just prior to commencement of a crimping operation, an individual crimpable connector is located at the crimping station. Then, if the limit switches interconnected with limit switch arms 77 and 78 of FIG. 1 are closed, cylinder 129 and the wire stuffer cylinder will be actuated. In FIG. 4, the stuffer wire has been denoted by the reference numeral 191, and is shown in phantom as it is fed through guide means 192 then along the path of the interconnected crimpable connectors or clips 48.

For emphasis, it is again noted that the cylinder for the wire stuffer 132 will or will not be advanced, depending on whether the limit switch associated therewith has been actuated by a cam carried on the cylinder 73 of FIG. 1. In addition, cylinder 129 automatically will or will not be actuated so as to change the orientation of the eccentric pin 137, depending upon whether the limit switch for actuation of cylinder 129 has or has not been actuated by a cam carried on the cylinder 73. If cylinder 129 has been actuated, it will have advanced rack 146 to the left as viewed in FIG. 4 until the stop nut 152 has closed limit switch LS4 (which readies apparatus 20 for a crimping operation) and abutted against the frame 156.

At this point, it is mentioned that other means may be used to indicate the forward-most position of the stop nut 152. For example, a flat washer may be trapped between the stop nut 152 and jam nut 153, and such flat washer may then be utilized to close a limit switch. Alternatively, photoelectric or other devices may be used.

Once the limit switch LS4 has closed, and the hand buttons 86, 87, and switch FS1 have been closed; ram 88 is energized to move toggle linkage 134 to its "extended" or crimping posture as shown in FIG. 4, and a crimp connection is made which will involve the lead wires that just previously have been positioned at the crimping station 61. The apparatus 20 then automatically (due to an electrical time delay as will be described in more detail hereinafter) returns ram 88 to its initial position; and the exhaust from ram 88 is directed to the vacuum means 118 for the purpose described hereinabove.

During the exhaust stroke of ram 88, shop air is supplied to the cylinder 131 so as to extend the rod thereof, and advance push pawl or "clip feed pawl" 201 attached to the end thereof. As ram or cylinder 131 is actuated, it advances a new crimp connector to crimping station 61, it being noted that a reel or other supply of crimp connectors 48 are located in close proximity to the apparatus 20. The mechanism 202, which is utilized to advance the crimp connectors to the crimping station, has been known heretofore and further explanation is not deemed necessary, it being sufficient to note that the entire mechanism 202 is supported from the machine frame by an arm 203 which pivotally supports (at pivot 204) the cylinder 131, and rigidly supports a spring arm 206. The arm 206 biases the cylinder 131 downwardly to ensure that the push pawl 201 will engage a clip 48 and advance it into the crimping station 61. On the other hand, spring arm 206 is sufficiently weak to let the cylinder 131 swing up as it retracts, so that the leading edge of the pawl 201 can ratchet past the clips 48 that are therebeneath. The mechanism 202 also includes a motion limiting arm 207 which moves with rod 208, and thus push pawl 201. The rear end of arm 207 carries an adjustable stop device in the form of screw 210 and jam nut 209. The effective or actual stroke of rod 208 then may be adjustably varied by threading screw 210 into or out of arm 207. The screw 210 abuts against the blind end of cylinder 131 to prevent continued movement of rod 208 during each stroke thereof. Thus, the stroke of rod 208 (and pawl 201) may be changed to correspond to the distance between different types of connector clips.

Crimpable connectors or clips are fed across a stock guide 211, and under the lip 212 of a guide channel portion of a pressure pad 213. The clips are maintained under slight clamping pressure by a pair of bolts 214, 216 which are threaded into the bottom of the pressure pad 213 which trap springs 217, 218 (confined at one end thereof in counterbored portions of the bolts) that bear against the stock guide 211. The pressure pad 213, in one reduction to practice, was purchased as a "Pressure Pad, Part No. 43-1" from Essex International. In the same reduction to practice, stock guide 211 was purchased from Essex International and identified as that company's "Part No. 44-3". It will be understood by persons skilled in the art, of course, that the pressure pad and stock guide are shaped and contoured to accommodate the geometry of the particular connector 48 that is being handled in the apparatus 20.

Figure 11:
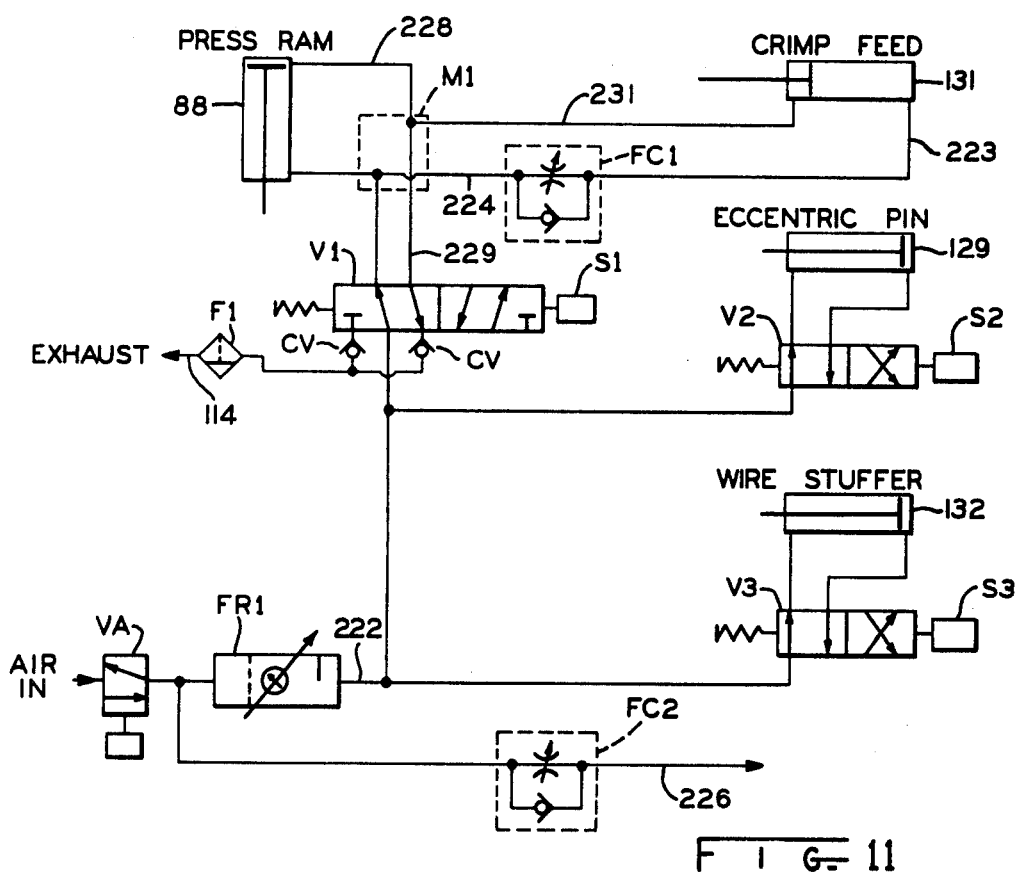
FIG. 11 is a schematic representation of a pneumatic system utilized to control the apparatus of FIG. 1.
Figure 12:
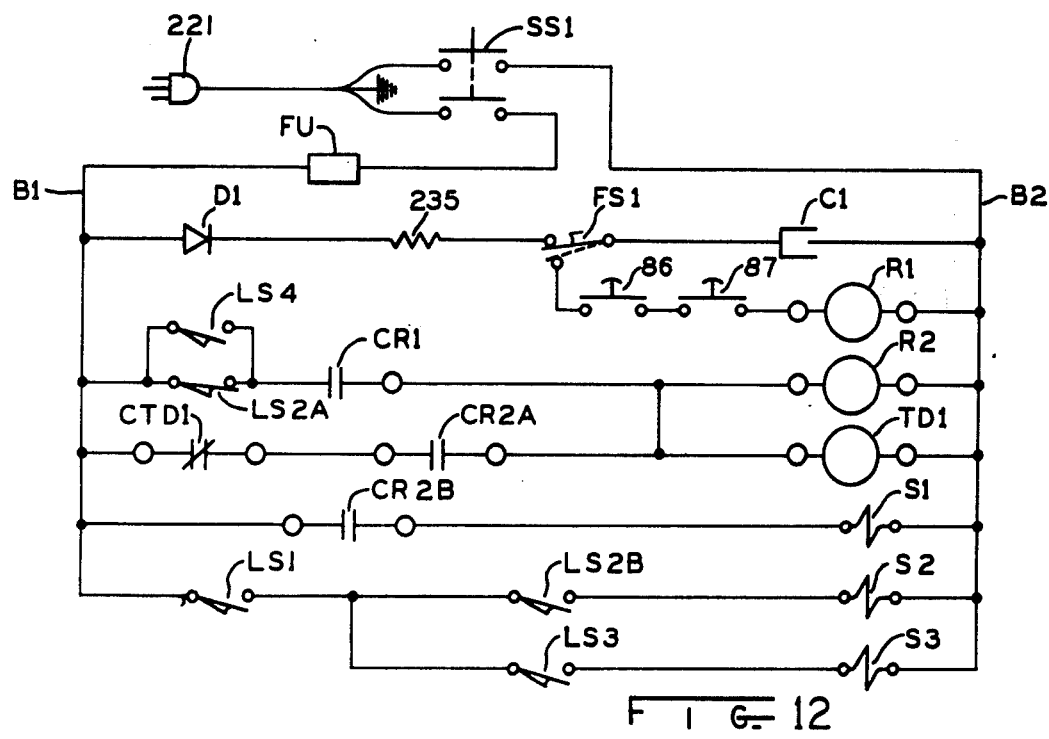
FIG. 12 is a schematic of an electrical control circuit that is utilized in conjunction with the pneumatic system of FIG. 11.

With reference now to FIGS. 11 and 12, the control and operation of the apparatus 20 will once again be explained. The same reference numerals have been used in FIGS. 11 and 12 for the same elements identified in other views, or parts intimately associated therewith. With particular reference now to FIG. 12, a power plug 221 must be plugged into a conventional 110 volt power source in order to prepare the apparatus 20 for operation. In addition, a safety switch SS1 is manually closed to interconnect the power source with bus lines B1 and B2.

The circuit of FIG. 12 is devised so that the apparatus 20 can be energized to form only one crimp at a time, and thus prevent malfunctions that might occur if the ram 88 were to be inadvertently energized in a manner that would effect a double stroke on a single given connector clip. This is accomplished by utilizing a solenoid operated valve VI (see FIG. 11) for energizing the main press ram 88 and by utilizing a control circuit such that it is necessary for an operator to simultaneously close two hand switches and one foot switch before the rod of cylinder 88 cam be stroked. With the arrangement illustrated in FIG. 12, a capacitor is utilized to provide a one shot application of DC voltage to a DC relay in order to initiate a machine cycle. Then, before the machine can again be cycled, at least one hand or foot operated switch must be opened for a period of time to permit recharging of the capacitor.

With the foregoing in mind, reference now is made to FIG. 11 where I have schematically illustrated the four pneumatic cylinders 88, 131, 129, and 132. Commencing at the lower left-hand portion of FIG. 11, it will be noted that a supply of air (for example shop air at approximately 90 pounds per square inch, or 6.5 atmospheres of pressure) is admitted to a manually operated slide valve VA (which may be a PNEU-TROL slide valve No. 5L-25). While valve VA is "on", air is supplied to a filter regulator FR1 and from there to line 222. On the other hand, when valve VA is "off", line 222 (and thus the system of FIG. 11) is vented to atmosphere.

The filter-regulator FR1 may, for example, be a "REGO TRIO" Model 8883. As will be understood by persons skilled in the art, the filter regulator FR1 filters the air passing therethrough, and lubricates the air with oil. For this reason, filter-regulator FR1 includes an oil reservoir to which oil is periodically added, it being understood that such oil is added to the air supply in order to lubricate the valves and cylinders in the system of FIG. 11.

The regulator section of filter regulator FR1 is set to regulate the pressure of air passing therethrough to a range of 80 to 90 psi. Line 222 is also connected to three valves V1, V2, and V3. The valve V1 is a solenoid operated directional valve and may, for example, be a NUMATICS VALVE model 3JSA4. When solenoid S1 is not energized, a spring in valve V1 holds it in a position so that the high pressure supply air is applied to the rod end of cylinder 88, and the movable crimp tooling is held in a raised or inoperative position. Under this condition, high pressure air is also supplied (by means of lines 224, 223) to the blind end of crimp feed cylinder 131, and push pawl 201 (see FIG. 4) is held in its advanced position.

Air is supplied to line 223 from the valve V1 by means of a manifold block M1 which is machined to provide the desired air line connections. Air moving from manifold block M1 to line 223 also passes through a flow control valve FC1, which permits exhaust air to flow therethrough with substantially no restriction, but which presents a variable restriction to the flow of air from line 224 to line 223. The flow control valve FC1 may be, for example, a PNEU-TROL flow control valve EF10-B. At the instant that solenoid S1 is deenergized and the spool of valve V1 returns to the position indicated in FIG. 11, air is supplied to manifold block M1 and then to cylinder 88 to cause the main press ram to retract. At this same time, air is supplied to line 224. However, the flow control valve FC1 establishes, in effect, a mechanical time delay; and the actuation of cylinder 131 is thereby delayed for a sufficient period of time to permit retraction of the press ram 88 before the cylinder 131 is actuated and advances a new connector clip to the crimping station.

Cylinder 129, which controls the relative rotational position of eccentric pin 137 (see FIGS. 4 and 5) is automatically controlled by valve V2 which is also a spring return solenoid operated directional valve. This valve may be, for example, a NUMATICS VALVE model 11SAD4-S50. When the solenoid S2 is energized, the rod of cylinder 129 is advanced, and when the solenoid S2 is de-energized, the rod of cylinder 129 is retracted as shown in FIG. 11. At this point, it should again be recalled that the actual amount of advance of the rod of cylinder 129 may be variably adjusted and controlled by mechanical or other means as previously discussed in connection with FIG. 4.

The wire stuffer 132 and the cylinder therefore (also identified by the refferrence numeral 132 in FIG. 11) is normally inoperative, and is only made operative to advance a link of stuffer wire when solenoid S3 is energized to shift the spool of valve V3 (which, for convenience, may be identical to the valve V2). Thus, if a segment of stuffer wire is needed for a particular interconnection, solenoid S3 will be actuated and air will be supplied from line 222 to the blind end of the cylinder 132. On the other hand, if stuffer wire is not needed for a particular connection, solenoid S3 will not be energized and shop air is supplied to the rod end of cylinder 132 and holds it in a retracted condition. The flow control valve FC2 (selected, for convenience, to be identical to the flow control valve FC1), and the line 226 that extends therefrom, is interconnected with a capillary port or tube 227 which is shown in FIG. 4.

Air leaving capillary tube 227 moves with a gentle flow that tends to direct air across the crimping station 61 and toward vacuum device 118. Thus, the flow of air from capillary tube 227 provides assistance in keeping the crimping station 61 free from debris.

With reference again to FIG. 11, the reason for providing filter F1 will be explained, it being assumed for a moment, that solenoid S1 has been actuated and that the rod of cylinder 88 has been fully advanced. Just after such rod has been fully advanced (and a crimp connection has been made); solenoid S1 is de-energized, and the spool of valve V1 returns to its initial position. Thereupon air pressure is applied to the rod end of cylinder 88, while the blind end of cylinder 88 is vented through line 228, manifold M1, and line 229 to the filter F1. Some of the air exhausted from cylinder 88 is applied to line 231 to effect retraction of the crimp feed cylinder 131 as previously mentioned. However, the balance of the air exhausted from cylinder 88 is supplied to filter F1 and thence to line 114 (which, it will be recalled, is used in the vacuum system of FIG. 3). Check valves CV (Deltrol No. EC20B) ensure that the exhaust air from both ends of cylinder 88 is applied to filter F1.

Since the air passing through line 114 surrounds scrap particles that are ultimately to be collected and disposed of, it is desirable that only dry air (i.e., substantially lubricant-free air) be admitted to the venturi 113 of FIG. 3. Filter F1 (which may be a REGO-FILTER No. 8823R) filters the air passing therethrough so that clean dry air is admitted to line 114.

With reference now to FIG. 12, the electrical control system for the apparatus 20 will be described. Upon closure of safety switch SS1, power is supplied to bus lines B1 and B2. With the arrangement shown, diode D1 effects halfwave rectification of the applied alternating voltage. When the operator controlled foot switch FS1 is in its normal position as illustrated in FIG. 12, the halfwave rectified voltage is supplied through resistor 235 and charges capacitor C1. The charging of capacitor takes a relatively short time (e.g., about a quarter of a second) and, once capacitor C1 has charged to approximately 110 volts, the system of FIG. 12 is ready for energization. It is noted at this point that relay R1 is a 110 volt DC relay, and that capacitor C1 must be dumped through the coil of relay R1 before it is actuated. The resistor 235 provides protection for the diode D1.

Prior to actuating foot switch FS1 (and the two thumb switches 86 and 87) the operator will have positioned a stator assembly in the stator holder 62 (of FIG. 1) and will have placed the leads extending therefrom in appropriate ones of the lead holders 63, 64 and 66. Moreover, the operator will have rotated the stator assembly (and holder 62) so that one of the lead holders will be positioned at the crimping station 61. Of course, when this occurs, the cams on the cam carrier or cylinder 73 will also be rotated and, depending upon what crimp heighth is desired, and whether a stuffer wire is needed, the limit switch arms 77 and 78 for the limit switches LS2 and LS3, respectively, will or will not be automatically deflected.

At the time that the stator holder 62 is moved to the crimping station 61, a limit switch LS1 is closed by the back side of the arm 82 (see FIG. 1) which supports the stator holder 62. Then, after placing one or more magnet wire leads (and, if needed for the particular connection, a stranded lead wire) in or along a clip 48 at station 61, the operator will depress the foot pedal and move switch FS1 from the solid line position to the dotted line position thereof as shown in FIG. 12. Thereupon, the operator closes thumb switches 86 and 87, and thus interconnects the coil of relay R1 with the capacitor C1.

Thereupon capacitor C1 discharges and picks up relay R1. At that time, (still having reference to FIG. 12) normally open relay contacts CR1 close and supply line voltage to relay R2 (assuming that the contacts LS4 of limit switch LS4 or the contacts LS2A of limit switch LS2 are closed).

The contacts LS4 of limit switch LS4 will in fact be closed if the cylinder 129 (see FIG. 4) has fully advanced and closed limit switch LS4, all as will be explained hereinbelow. On the other hand, the contacts LS2A will be closed if no cam on drum 73 (see FIG. 1) has tripped limit switch arm 77. This safety interlock system is described in more detail hereinafter, but for purposes of the present discussion it is simply assumed that either contact LS4 or contact LS2A is closed so that relay R2 picks up when the contacts CR1 are closed.

When relay R2 picks up, normally open relay contacts CR2A and contacts CR2B close. At this instant, two events occur. First, the closure of contacts CR2A establishes a path for holding current to relay R2 through normally closed contacts CTD1 of time delay relay TD1. In addition, closure of the contacts CR2A energize time delay relay TD1.

When relay R2 is initially energized, normally open contacts CR2B close and energize the coil of solenoid S1. Energization of solenoid S1 causes a crimping action to occur (see FIG. 11) as air is supplied to the blind end of cylinder 88. Time delay relay TD1 is set to time out after one to one-and-one-half seconds, but this is a sufficient amount of time to ensure that ram 88 will establish a satisfactory crimped interconnection. When time delay relay TD1 times out, the normally closed contacts CTD1 open momentarily, interrupting current to relay R2, and relay R2 drops out. Thereupon, contacts CR2A and CR2B again open, with the result that solenoid S1 is de-energized and valve V1 (see FIG. 11) causes the retraction of the rod of cylinder 88 and (after a short time delay caused by flow control valve FC1), the advance of pawl 201 by cylinder 131.

With reference to FIG. 11, it will be recalled that the heighth of a crimped interconnection can be changed by actuating the cylinder 129 (under the influence of solenoid S2 and valve V2). Moreover, it will be recalled that a stuffer wire will be fed to the crimping station if solenoid S3 is energized, thereby to shift the spool of valve V3.

From FIG. 12, it will be noted that the solenoids S2 and S3 can only be energized if limit switch LS1 has been closed (thereby indicating that the stator holder 62 of FIG. 1 has been moved to a position proximate to the crimping station 61). Moreover, normally open limit switch contacts LS2B will be closed only if a cam on drum 73 has engaged limit switch arm 77. Similarly, solenoid S3 will be actuated only when the stator holder 62 is adjacent to the crimping station 61 (so that contacts LS1 of limit switch LS1 have been closed), and only if a cam carried by drum 73 has engaged switch arm 78 so as to close limit switch contacts LS3.

It was briefly mentioned hereinabove that a safety interlock system is provided which involves limit switch contacts LS4, and the limit switch contacts LS2A. This interlock system ensures that a crimp will be made (when a minimum height crimp is needed) only if the rod of cylinder 129 has been extended to a point such that limit switch LS4 has been closed.

For example, assuming that limit switch contacts LS1 have been closed, and further assuming that limit switch contacts LS2B have been closed calling for the actuation of cylinder 129 by solenoid S2; it will be noted that the normally closed contacts LS2A will be open. This disables the pick-up circuit for relay R2 in the event that cylinder 129 has not in fact advanced the rod thereof and closed limit switch LS4.

For purposes of exemplification only, but not for purposes of limitation, the various circuit elements illustrated in FIG. 12 will now be described in more detail. More specifically, the safety switch SS1 may be any suitable 110 volt switch, and fuse FU may have a five ampere rating. Diode DI has been a 600 volt, 11.5 ampere, GE diode type 1N1348. Resistor 235, for the application shown in FIG. 12, was selected to be an eight watt, one hundred ohm, OHMITE resistor. The foot switch FS1 and push button switches 86 and 87 were conventional commercially available hardware items; whereas the capacitor C1 was an eight microfarad, 400 volt component.

In the same reduction to practice, relay R1 was a Potter and Brumfield DC relay, type KRP11DG whereas the relay R2 was a Potter and Brumfield AC relay type KRP11AG; and time delay relay TD1 was an Eagle Timer No. CG2A6 (with a maximum time delay capability of two seconds). The limit switches LS1 through LS4 were all MICRO SWITCH limit switches.

From all of the foregoing, it is believed that a full and complete disclosure has now been made of preferred modes for practicing the invention, and for constructing apparatus that embodies the invention in preferred forms. Accordingly, the detailed disclosure made herein is for purposes of enablement, and not for purposes of limitation.

FIG. 4 illustrates stuffer or filler wire 191 being fed along the path followed by clips 48 along pressure pad 213. At least occasionally with this illustrated arrangement it is possible for the free or lead end of the stuffer wire to engage a side or leg of a clip 48 during advancement of the stuffer wire. Should this occur, a stuffer wire segment at the free end thereof may be bent and not be advanced into a clip 48 for crimping therewithin, even though it should be. Moreover, problems may arise with the arrangement shown in FIG. 4 related to the relative placement of a stuffer wire segment and magnet wire segments as discussed hereinabove.

Accordingly, in even more preferred arrangements, I bore a longitudinally extending hole along the clip feed pawl 201 to establish a desired stuffer wire path as generally represented at 219. An auxiliary guide, such as a small tube may also be mounted to the feed pawl in alignment with this path and the stuffer wire is then fed thereinto. Preferably, the path through the feed pawl is a hole sufficiently small so that the stuffer wire free end (if bent) will be straightened when it is retracted therealong. With the arrangement now being described, it is also preferable to mount the wire stuffer 132 on a support plate that is movable longitudinally relative to pressure pad 213 under the influence of an auxiliary prime mover such as a fluid cylinder or relay. With the preferred arrangement thus described, when filler wire is to be provided in a crimped connection, the wire stuffer 132 will be actuated to advance in the neighborhood of (for the particular Essex clip described hereinabove) one quarter of an inch of filler wire along the path 219. At the same time that the wire stuffer is actuated, the auxiliary prime mover will advance the entire wire stuffer mechanism 132 and thus the lead end of the filler wire toward the crimping station. Thereupon, the lead one quarter inch of filler wire will be severed and crimped into a clip 48 in overlying relationship to the magnet wire segments positioned adjacent the lower serrated surface of such clip.

After the connection has been made, the auxiliary prime mover will return the wire stuffer 132 to its rest or dwell position. This action retracts the lead end of the stuffer wire into the feed pawl with the result that straightness of the stuffer wire end is assured. In actual operation, all wires are in a proper desired predetermined position as each crimp is begun. Because of the crimping action and the shape of the crimped splice (as shown, e.g., in FIGS. 7-9), the filler wire ends up at one side of the connector splice. This in turn consistently results in the magnet wire being in direct contact with the clip serrations.

In another method, I advance a filler wire a predetermined distance as needed for a given splice connector and also advance the filler wire feed mechanism along with the filler wire a desired amount through a clip feed pawl. These two advancing actions may take place, of course, sequentially or substantially simultaneously. I then complete a crimped splice, connection, and retract the filler wire feed mechanism (and thus the free end of the filler wire) and straighten any major bends in the end of the filler wire.

With regard to the crimping process itself, I ensure that a filler wire segment will overlie magnet wire segments in a connector clip prior to effecting a crimping action and thus ensure a good direct contact between clip serrations and magnet wire segments after a crimped splice has been made.

It should now be apparent to persons skilled in the art that numerous modifications may be made while still practicing and retaining the benefits of various inventive aspects that have been taught by applicant. For example, indicia that represent the relative orientation of stator assembly leads vis-a-vis a crimping station have been illustrated in the form of mechanical and electro-mechanical elements. However, it should be obvious that optical means could also be provided. For example, proximity sensing or photo-electric devices could be utilized in lieu of mechanical switches.

It also will be understood that magnetic indicia could be provided on each stator assembly, and that such indicia would then be used to control the actuation of solenoids in FIG. 12 whenever such magnetic indicia were proximate to a reference position of the apparatus 20.

Accordingly, while there has been shown and described herein preferred embodiments of the present invention in accordance with the Patent Statutes, changes may be made therein without actually departing from the true spirit and scope of the invention. Accordingly, I intend to cover in the following claims all such equivalent variations as fall within the invention.

I claim:

1. Apparatus for forming differently configured crimped connections involving lead wires extending from a given stator assembly, said apparatus including a holder for supporting a stator core assembly; a frame supporting a crimping mechanism; eccentric means movable about a longitudinally extending center line; a toggle linkage having at least one part thereof extending from the eccentric means; said toggle linkage having selectable different effective strokes during stator crimping operations with each effective stroke being determined by the angular orientation of the eccentric means about the center line; and means for making a continuous adjustment of the angular position of the eccentric pin, thereby to permit continuous adjustment of toggle linkage travel within predetermined limits of travel; and means for automatically adjusting the angular position of the eccentric pin, thereby to establish different selectable strokes of the toggle linkage during operation of the apparatus for establishing the differentialy configured crimped connections for the given stator.

2. A crimping machine for making differently configured crimp connections involving magnet wire leads of stator assemblies, the machine comprising: a movable crimping tool; a fluid cylinder having an adjustable stroke; a rack and pinion with the rack driven by the fluid cylinder; an eccentric pin rotatable by the pinion, with the rotational position of the eccentric pin controlling the amount of travel of the crimping tool; the adjustable stroke of the fluid cylinder providing a variable adjustment of the rotational position of the eccentric pin during operation of the machine upon a given stator assembly for causing the crimping tool to establish the differently configured crimped connections for the given stator assembly.

3. In a crimping machine of the type having an anvil, a forming tool movable toward the anvil, the forming tool carried by a linkage arrangement and cooperating with the anvil to fasten at least one connector on at least one wire placed between the tool and the anvil when the tool approaches the anvil, the improvement comprising: means for continuously varying the limits of travel of the tool relative to the anvil; and means for automatically controlling said means for continuously varying whereby at least two preselected and different travel distances of the tool relative to the anvil are automatically provided.

* * * * *

UNITED STATES PATENT AND TRADEMARK OFFICE
CERTIFICATE OF CORRECTION

PATENT NO. : 4,148,137
DATED : April 10, 1979
INVENTOR(S) : Alan L. Kindig

It is certified that error appears in the above-identified patent and that said Letters Patent are hereby corrected as shown below:

```
Col. 1, line 36, change "standard" to --stranded--.
Col. 9, line 19, change "in" to --into--;
        line 40, change "vaccum" to --vacuum--.
Col. 10, line 7, change "international" to --International--.
Col. 13, line 9, change "VI" to --Vl--.
Col. 18, line 31, delete "I claim" and insert --What I claim
    as new and desire to secure by Letters Patent of the
    United States is:--
        line 51, delete "tialy" and insert --tly--.
```

Signed and Sealed this

Second Day of October 1979

[SEAL]

Attest:

RUTH C. MASON
*Attesting Officer*

LUTRELLE F. PARKER
*Acting Commissioner of Patents and Trademarks*